Nov. 2, 1926. 1,605,775
E. R. RICHARDS
LIGHT
Filed Dec. 14, 1923 2 Sheets-Sheet 1
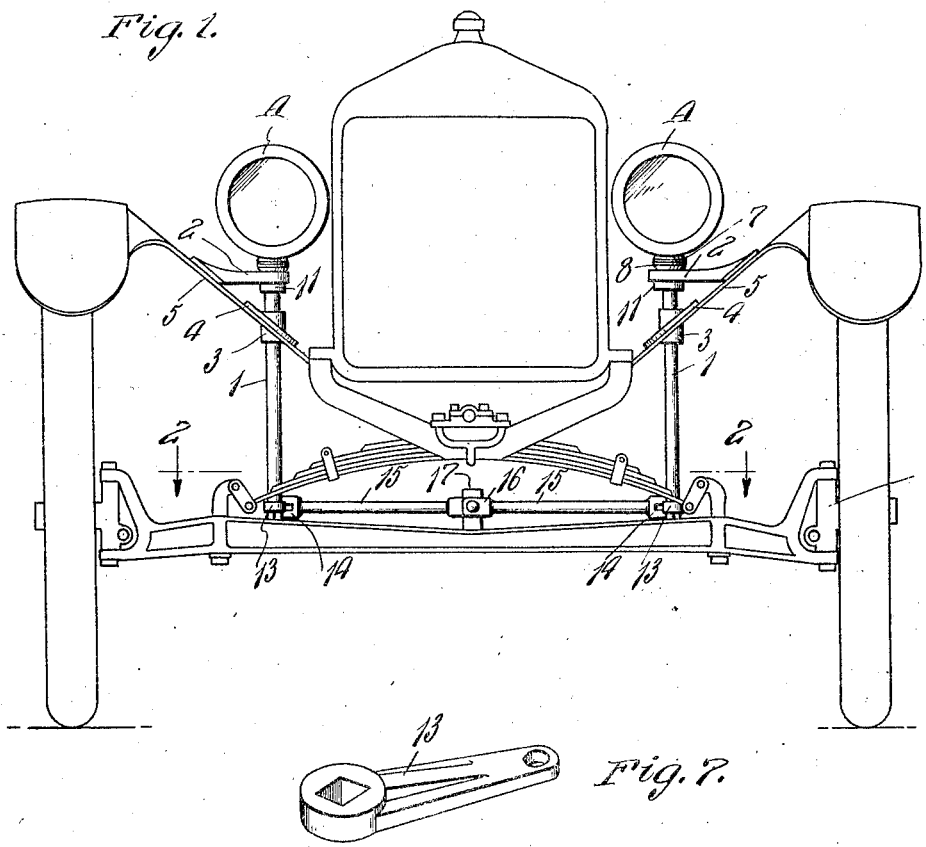
Fig. 1.
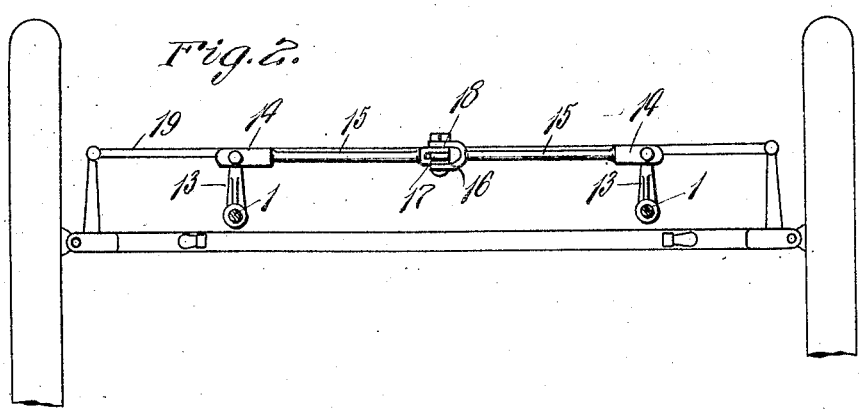
Fig. 7.
Fig. 2.
E. R. Richards
INVENTOR
BY Victor J. Evans
ATTORNEY
WITNESS:

Nov. 2, 1926.

E. R. RICHARDS 1,605,775

LIGHT

Filed Dec. 14, 1923   2 Sheets-Sheet 2

E. R. Richards
INVENTOR

BY Victor J. Evans
ATTORNEY

WITNESS:

Patented Nov. 2, 1926.

1,605,775

UNITED STATES PATENT OFFICE.

EDWARD R. RICHARDS, OF WEST FRANKFORT, ILLINOIS.

LIGHT.

Application filed December 14, 1923. Serial No. 680,756.

The object of this invention is to provide means for moving the headlights of a motor vehicle so that the rays of light will follow the road on curves as well as on straight portions.

Another object of the invention is to simplify the construction that the improvement can be placed on cars with but slight expense.

This invention also consists in certain other features of construction and in the combination and arrangement of the several parts, to be hereinafter fully described, illustrated in the accompanying drawings and and specifically pointed out in the appended claim.

In describing my invention in detail, reference will be had to the accompanying drawings wherein like characters denote like or corresponding parts throughout the several views, and in which:—

Figure 1 is a front view of an automobile showing the invention in use.

Figure 2 is a section on line 2—2 of Figure 1.

Figure 3:
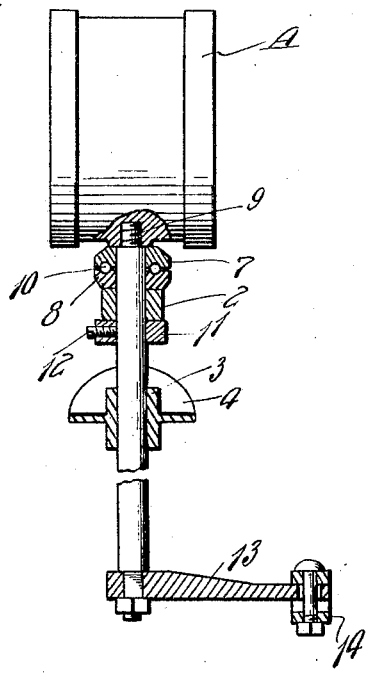
Figure 3 is a section on line 3—3 of Figure 1.
Figure 4:
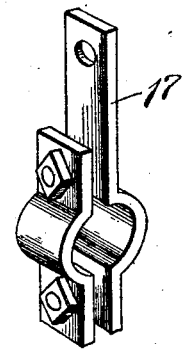
Figures 4, 5 and 6 are detail views.
Figure 5:
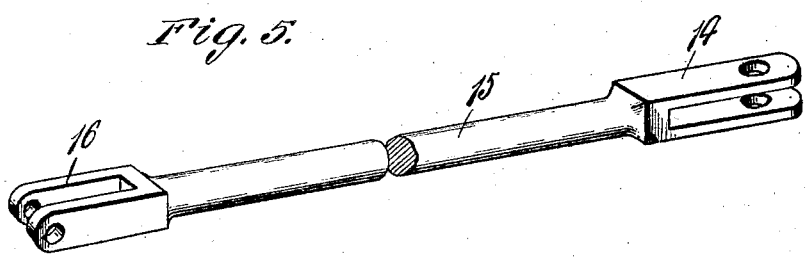
Figure 6:
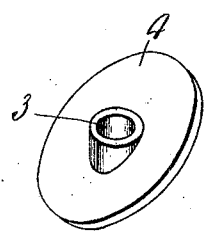

In these views, 1 indicates a pair of standards which pass through the lamp supporting brackets 2 and through bushings 3 which are carried by the plates 4, riveted or otherwise fastened to the inclined parts 5 of the fenders 6 of the vehicle. The bushings pass through holes formed in said parts 5 so as to give a substantial bearing for the standards. The upper end of each standard is connected with a member 7 having a flat lower face with a ball race therein and which is engaged by the flat face of a similar member 8 which rests upon the bracket. The lamp A is secured to the standard by a screw threaded end 9. Balls 10 are placed in the races in the two members. As will be seen the member 8 rests upon the bracket 2 and a collar 11 engages the under face of the bracket and is fastened to the standard by the set screws 12. The lower end of each standard is provided with a square part for engaging a square socket formed in the outer end of an arm 13 which has its rear end pivoted between the forks 14 of a bar 15. The inner ends of the bars 15 are also forked, as shown at 16, and the prongs of each fork engage each other and are pivoted to a clamp 17, as shown at 18. This clamp 17 engages the connecting rod 19 of the steering mechanism.

It will thus be seen that when the connecting rod 19 is moved in the steering of the vehicle, such movement will be communicated to the headlamps by means of the arms 13, and the standards 1 so that the rays of light will follow the road on curves as well as on straight portions.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In combination with a vehicle including a connecting rod and fenders having inclined portions, of a pair of vertically disposed standards arranged in spaced relation on opposite sides of the front of the vehicle, bushings in the inclined portions of said fenders to receive said standards, supporting brackets attached to the fenders and embracing the upper ends of said standards, opposed bearing members having similar ball races therein and balls within said races, said bearing members being supported upon the supporting brackets and arranged directly beneath the upper end of the standards.

In testimony whereof I affix my signature.

EDWARD R. RICHARDS.